2,704,253
LIGHT SENSITIVE BICHROMATE COMPOSITION

Dewey J. Janet, Jr., Arlington, Va.

No Drawing. Application April 14, 1952,
Serial No. 282,257

1 Claim. (Cl. 95—7)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a composition and process for preparing prints by photographic processes, and more particularly to a light-sensitive composition and process utilizing this composition for preparation of brown-line contact prints.

Brown-line prints previously have been prepared by a silver print process in which the surface, such as paper supported on metal or other suitable mounting material, plastic or fiber glass sheets, is coated with an emulsion of a light-sensitive silver salt, the coated surface is exposed under a photographic negative in a photographic apparatus, and the exposed sheet is then developed by use of a fixing solution and by washing. When such prints are made on paper supported on metal or other rigid materials, the washing and fixing required in developing causes the paper to warp, streak, and fuzz. The background tends to mottle from silver absorbed deep in the paper. The prints have little resistance to weather conditions and fade on exposure to sunlight and moisture. The extra exposure time sometimes required in exposing the prints under poor negatives causes the silver prints to be undesirably dark. When silver prints are made on fiber glass or plastic sheets, they are also subject to mottling from absorbed silver, and to fading under the normal conditions of use.

Accordingly, it is our object of this invention to provide a novel composition for preparing an improved brown-line contact print.

Another object of this invention is to provide an improved process for preparing brown-line prints.

A further object of this invention is the preparation of brown-line contact prints which are free from warping, mottling, and fading during development and use.

A still further object of this invention is the preparation of brown-line contact prints in which the shade of brown is substantially the same for different exposure times.

Other and more specific objects of the invention will appear from the description and claim hereinafter following.

These objects are accomplished by preparing a light sensitive composition by mixing an aqueous solution of albumin with an aqueous solution of ammonium dichromate and with an emulsion or solution of Toluidine Red. The resulting mixture is applied to the surface to be sensitized, such as metal mounted paper, plastic or fiber glass sheets, in a smoth uniform coating. The coated sheets are then dried to form a dichromate-albumin film thereon incorporating the Toluidine Red. The coating is then exposed to a strong light under a negative. To develop the brown print, the exposed plate is washed with water to remove the unexposed portion of the coating, and then dried. The exposed part remains a sepia-brown or reddish-orange color, and when in the form of lines as, for example, in map reproduction work, is generally designated as a brown-line print.

In preparation of the light-sensitive composition, a stock solution of albumin conveniently may be made up of two parts of egg albumen to twelve parts of water by weight to provide an approximately 14% albumin solution. Other sources of albumin, such as gelatin or powdered milk may be substituted for egg albumen if desired. Likewise, a stock solution of ammonium dichromate may be made up of 1 part of ammonium dichromate and 20 parts of water by weight to provide an approximately 5% solution. The red dye emulsion conveniently may comprise about 30 parts Toluidine Red, 65 parts water by weight and minor amounts of emulsifying and dispersing agents, that is, an aqueous solution or emulsion containing about 30% Toluidine Red. Red Dyrite contact emulsion manufactured by Direct Reproduction Corporation is a suitable source of the Toluidine Red for the purposes of this invention.

The stock solutions of albumin, ammonium dichromate, and red dye emulsion prepared as above are preferably mixed in the following proportions by volume:

6 parts albumen solution
2 parts ammonium dichromate solution
2 parts Red Dyrite contact emulsion These proportions may be varied slightly without materially affecting the results. However, when insufficient albumin and ammonium dichromate are used, the entire film has a tendency to wash off during development of the exposed print. Where lesser quantities of pigment are employed, the print becomes lighter in color. Other stock solutions of albumin, ammonium dichromate, and dye emulsion may be employed provided the final proportions of albumin, ammonium dichromate, and red pigment are adjusted to correspond approximately to those in the mixture given above.

The invention is further illustrated but is not intended to be limited by the following example of practice.

Example

A stock solution of 2 ounces of dry egg albumen in 12 ounces of water and a stock solution of 1 ounce of ammonium dichromate in 20 ounces of water is mixed with Red Dyrite contact emulsion in the following proportions:

6 oz. albumin solution
2 oz. ammonium dichromate solution
2 oz. Red Dyrite contact emulsion After mixing, the resulting solution is filtered through cotton or other filter medium.

The sheet to be coated is washed with clear water and placed while wet in a conventional whirler or similar apparatus. The whirler is started and the sensitizing solution is poured on smoothly. The whirler is run at approximately 55 R. P. M. for approximately 15 minutes or until dry. Application of moderate heat during the whirling may be used to facilitate drying.

To produce a photographic image, the plate is exposed under a negative in any suitable device, as in a vacuum printing frame. The normal exposure time for a good negative is approximately 3 minutes in the light of a 35 ampere arc lamp at a distance of 36 inches. For poor negatives the time may be increased as desired. The shade of brown is always the same regardless of how much extra exposure time is given.

To develop the brown print, it is placed under running water and may be wiped with cotton to remove the unexposed coating. The exposed dichromated albumin adheres to the surface of the print and the red pigment remains intact throughout the adhering layer and is not removed either by continued washing or subsequent use.

The process requires less than one-half the time required to make brown-line prints by the silver print process. The resulting print holds its color permanently and does not mottle, streak or fade on exposure to weather conditions.

The invention is of particular importance in map-reproduction work, since prints made thereby show no deterioration on long exposure to direct sunlight, and are much easier for geologists to compile on than conventional prints heretofore employed. In addition, one complete photographic step is eliminated in their preparation, and the color registry of maps so prepared is much superior to those previously used. While particularly useful in map work, the invention is not to be considered limited thereto.

Although what is now considered the preferred manner of carrying out the invention has been described, the same is merely illustrative and all changes and modifications are contemplated that come within the scope of the claim appended hereto.

What is claimed is:

A light-sensitive solution for preparation of brown-line contact prints comprising about six parts of aqueous albumin solution containing approximately 14% albumin by weight, about 2 parts of aqueous ammonium dichromate solution containing approximately 5% ammonium dichromate by weight, and about 2 parts of aqueous red dye emulsion containing approximately 30% by weight of Toluidine Red.

References Cited in the file of this patent

UNITED STATES PATENTS

| 827,188 | South | July 31, 1906 |
| 946,470 | Spath | Jan. 11, 1910 |

FOREIGN PATENTS

| 4,043 | Great Britain | 1912 |
| 137,108 | Great Britain | Jan. 8, 1920 |

OTHER REFERENCES

Eder, Ausfuhrliches Handbuch der Photographie, vol. 4, part 2, Das Pigmentverfahren (1926), (page 31).